No. 659,697. Patented Oct. 16, 1900.
C. W. RICHARDS & W. M. CHAPMAN.
POWER TRANSMITTING MECHANISM.
(Application filed Aug. 17, 1899.)
(No Model.)
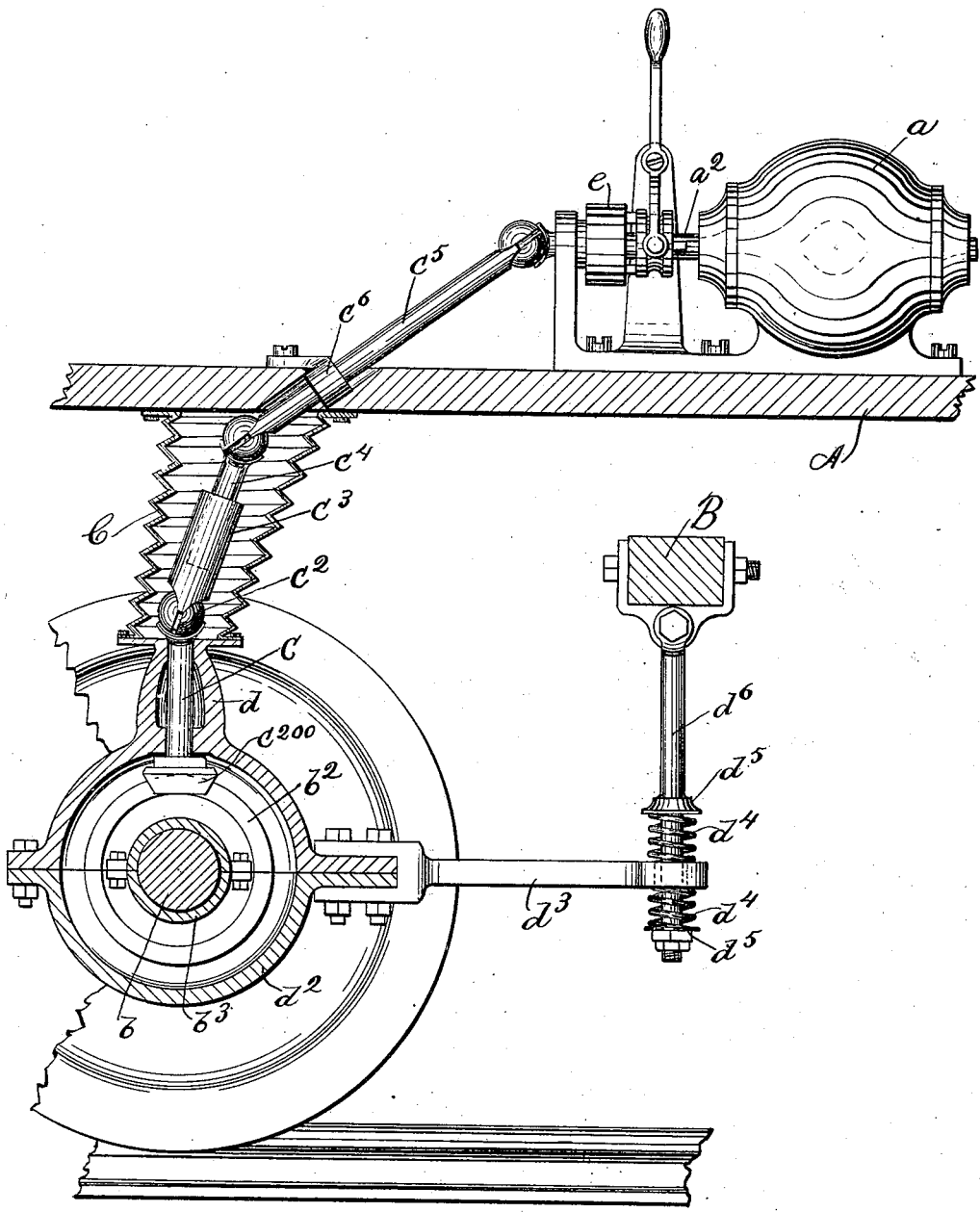
WITNESSES.
INVENTORS.

UNITED STATES PATENT OFFICE.

CHARLES W. RICHARDS AND WINTHROP M. CHAPMAN, OF NEEDHAM, MASSACHUSETTS.

POWER-TRANSMITTING MECHANISM.

SPECIFICATION forming part of Letters Patent No. 659,697, dated October 16, 1900.

Application filed August 17, 1899. Serial No. 727,492. (No model.)

*To all whom it may concern:*

Be it known that we, CHARLES W. RICHARDS and WINTHROP M. CHAPMAN, residing in Needham, county of Norfolk, and State of Massachusetts, have invented an Improvement in Power-Transmitting Mechanism, of which the following description, in connection with the accompanying drawing, is a specification, like letters on the drawing representing like parts.

The present invention relates to driving mechanism for a dynamo or other machine carried by a car or other vehicle and driven by power generated in the movement of said vehicle. Machines of this class are used in car-lighting systems in which the lights are supplied with current by a dynamo driven from the axle of the car as the same travels.

The principal object of the present invention is to provide practical means for transmitting power from the car-axle to a dynamo within the car, and in accordance with the invention the dynamo itself is mounted on the car-body, having a firm support, for example, upon the floor of the car, and the power is transmitted to the dynamo by means of flexible connecting devices which connect the axle with the armature-shaft of the dynamo. The dynamo itself is thus relieved of the jar and vibration of the trucks and may be much more lightly built than heretofore, while the gearing itself may be small and light and easily incased, so as to be thoroughly protected from dirt. Furthermore, the dynamo may be inspected at any time, even when the car is in motion, and any slight repairs that may be needed can be made at once, as a hand-operated clutch is interposed between the dynamo and driving connection.

The drawing is an elevation, partly in section, of a driving mechanism embodying the invention.

The dynamo is shown as firmly secured to the floor A of the car, the armature-shaft $a^2$ being rotatably connected through a hand-operated clutch $e$ with the car-axle $b$, which is mounted in the usual truck on which the car-body is spring-supported, the construction of the truck not being shown, since it forms no part of the present invention. In all cars mounted in this way upon trucks there is a considerable movement of the trucks independent of the car-body, this movement taking place in all directions as the relative positions of the truck and body of the car change. In order, therefore, to transmit the power from the axle to the dynamo-armature when said parts are arranged in accordance with the present invention, it is necessary to have a flexible power-transmitting device extending from the driving to the driver member.

As herein shown, the axle $b$ is provided with a bevel-gear $b^2$, shown as formed on a split sleeve $b^3$, bolted or otherwise secured to the axle, the said gear meshing with a similar gear $c^{200}$ on a counter-shaft $c^2$. The said counter-shaft is shown as provided with bearings in a projection $d$, said projection being formed integral with a split gear-case $d^2$, which has its bearings on the split sleeve $b^3$. The counter-shaft $c$ is shown as connected by a universal joint $c^2$ with a member $c^3$, which in turn is connected by a slip-joint to a member $c^4$, the said member $c^4$ being connected by a universal joint of any suitable construction with a member $c^5$, which is similarly connected through the clutch $e$ with the armature shaft $a^2$. The said member $c^5$ is provided with a suitable bearing $c^6$, shown as secured to the floor A of the car, it being obvious that the intermediate members $c^3$ and $c^4$ with their universal joints will compensate for the play of the car-truck, which is independent of that of the car-body.

To resist the tendency of the gear-case $d$ and connected parts to travel around with the axle $b$, the said gear-case is shown as provided with an arm or extension $d^3$, the end of which is supported by stiff springs $d^4$, interposed between said arm and collars $d^5$ on a rod $d^6$, which is properly secured to one of the members B of the truck-frame. The gear case $d^2$ is so constructed as to completely inclose the gears $b^2$ $c^{200}$, and in order to completely inclose all the working parts the members $c$, $c^3$, and $c^4$ are shown as inclosed in a flexible casing C, which is secured at one end to the upper end of the bearing member and at the other end to the under side of the car-floor. By this construction the dynamo is in a protected position in the interior of the car and is also readily accessible for examination or repairs, while the driving mechanism is fully protected from dirt and may be simply and lightly constructed. In practice the member *d* would probably be inclined from a vertical position and the dynamo mounted at a somewhat greater distance from the trucks, so that the angles between the various driving members might be much less acute, thus largely relieving the friction in the universal joints, or the dynamo may be vertically mounted, so that the line of shafting will be practically straight.

We claim—

1. The combination with a dynamo supported on the body of a car; of gearing supported by and driven from the car-axle; a gear-case also supported upon the car-axle and affording a bearing for the driven member of said gearing; and shafting provided with universal and slip joints connecting said gearing with said dynamo substantially as described.

2. The combination with a dynamo supported on the body of a car; of gearing supported by and driven from the car-axle; a gear-case also supported upon the car-axle and affording a bearing for the driven member of said gearing; shafting provided with universal and slip joints connecting said gearing with said dynamo; and a flexible casing for said joints and shafting, substantially as described.

In testimony whereof we have signed our names to this specification in the presence of two subscribing witnesses.

CHARLES W. RICHARDS.
WINTHROP M. CHAPMAN.

Witnesses:
HENRY J. LIVERMORE,
JAS. J. MALONEY.